United States Patent [19]

Farzan et al.

[11] Patent Number: 5,758,429
[45] Date of Patent: Jun. 2, 1998

[54] TRANSLATION AND ROTATION COUPLED POSITIONING METHOD AND APPARATUS

[76] Inventors: Farshad Farzan, 4872 Alonzo Ave., Encino, Calif. 91316; Jack Epstein, 64 Gloria Dr., Allendale, N.J. 07401

[21] Appl. No.: 649,891

[22] Filed: May 14, 1996

[51] Int. Cl.$^6$ .................................. G01B 5/008
[52] U.S. Cl. .......................... 33/503; 33/1 MP
[58] Field of Search ...................... 33/503, 1 MP, 33/512

[56] References Cited

U.S. PATENT DOCUMENTS

| | | | |
|---|---|---|---|
| 2,753,634 | 7/1956 | Tamplin | 33/503 |
| 2,801,475 | 8/1957 | Meyer, Jr. . | |
| 3,002,279 | 10/1961 | Miller . | |
| 3,561,125 | 2/1971 | Zeidler | 33/503 |
| 3,906,639 | 9/1975 | Wilamowski . | |
| 3,942,253 | 3/1976 | Gebel et al. . | |
| 4,128,943 | 12/1978 | Muhlethaler . | |
| 4,679,331 | 7/1987 | Koontz | 33/503 |
| 4,703,443 | 10/1987 | Moriyasu | 33/503 |
| 4,729,174 | 3/1988 | Caron et al. . | |
| 4,852,402 | 8/1989 | Bertz . | |
| 4,910,446 | 3/1990 | McMurtry et al. | 33/503 |
| 4,961,267 | 10/1990 | Herzog | 33/503 |
| 4,976,043 | 12/1990 | Bieg | 33/572 |
| 5,131,166 | 7/1992 | Weber | 33/503 |
| 5,134,782 | 8/1992 | Breyer et al. | 33/503 |
| 5,198,990 | 3/1993 | Farzan et al. . | |
| 5,309,646 | 5/1994 | Randolph, Jr. et al. | 33/503 |

FOREIGN PATENT DOCUMENTS

| | | | |
|---|---|---|---|
| 1455224 | 1/1989 | U.S.S.R. | 33/503 |

OTHER PUBLICATIONS

An American National Standard—ANSI/ASME B89.1 12M–1985, pp. 9–13.

*Primary Examiner*—Thomas B. Will
*Attorney, Agent, or Firm*—Patula & Associates

[57] ABSTRACT

A positioning method and apparatus is disclosed in the form of a coordinate measurement machine for transmitting movement in three degrees of freedom, where two degrees of freedom are achieved by translational motion and the third degree of freedom is achieved by rotational motion. The coordinate measurement machine includes a base plate mounted on top of a base support, a pair of carriages rotatably mounted around base plate and supporting a bridge assembly. The bridge assembly supports a saddle assembly which suitably mounts a z-axis beam therein. Mounted to the end of the z-axis beam is a probe for measuring and inspecting the workpiece. The z-axis beam moves in an x-direction along an x-axis beam and in a z-direction within the saddle while the bridge assembly rotates about a c-axis. Reader heads mounted in the carriages electronically read a c-axis scale mounted about the base plate. A drive system including a belt and pulleys located in each carriage frictionally rotate the bridge assembly and carriages about the base plate.

25 Claims, 20 Drawing Sheets

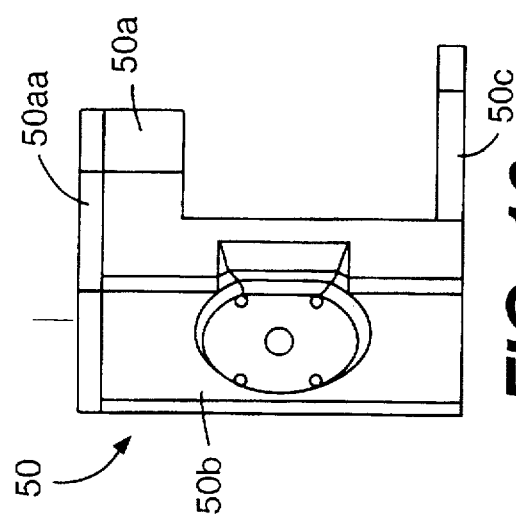
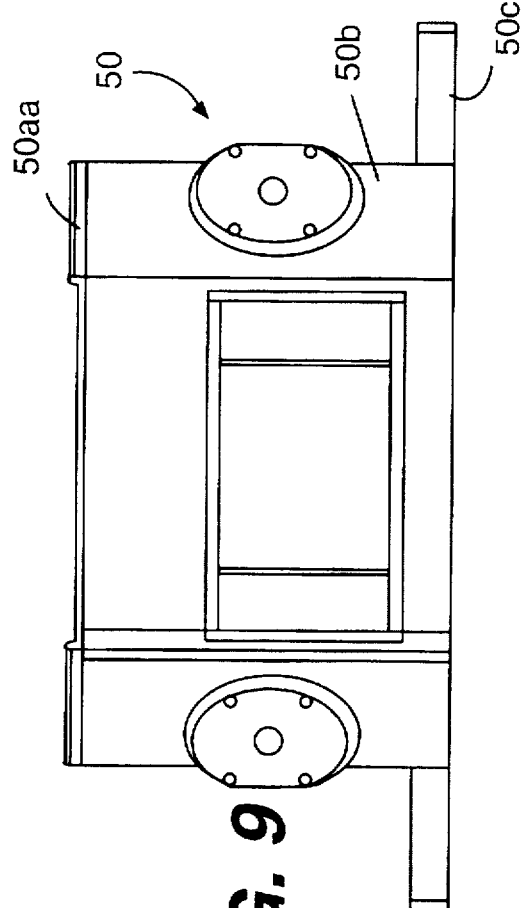
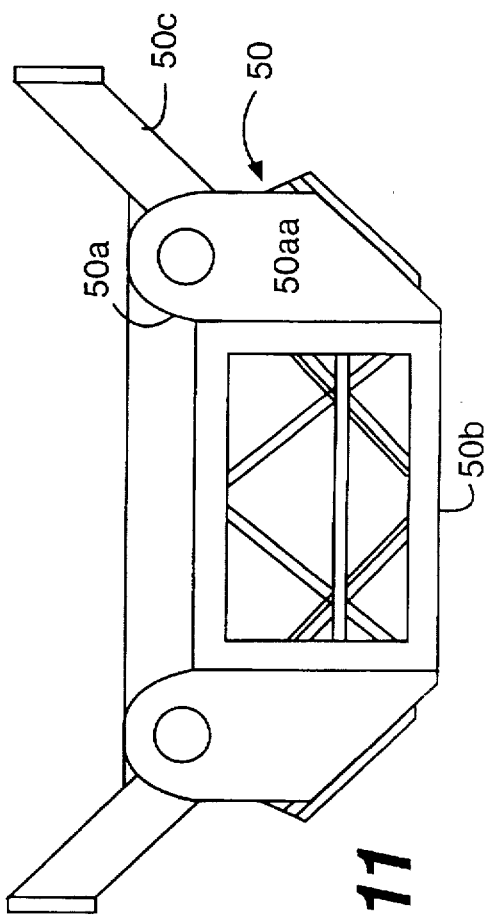

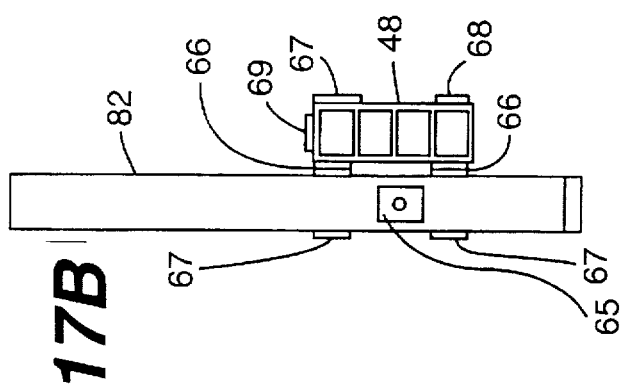
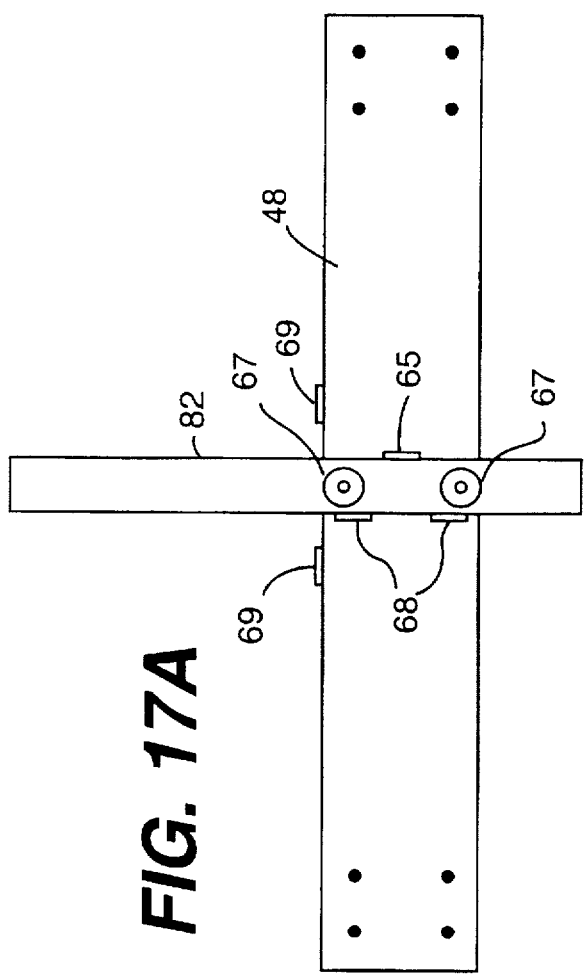
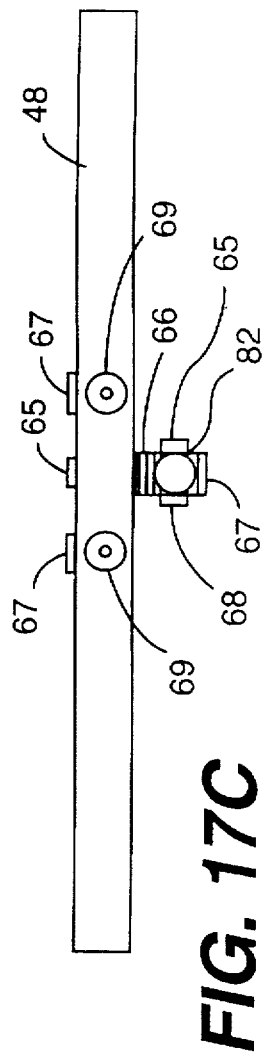

5,758,429

TRANSLATION AND ROTATION COUPLED POSITIONING METHOD AND APPARATUS

The present invention relates to the field of positioning and motion devices, and in particular to coordinate measuring machines. Specifically, the preferred embodiment of the present invention relates to a coordinate measurement machine for transmitting movement in three degrees of freedom wherein two degrees of freedom are achieved by transitional motion and the third degree of freedom is achieved by rotational motion.

BACKGROUND OF THE INVENTION

Apparatus for measuring or inspecting a three dimensional object are known in the art and commonly referred to as Coordinate Measurement Machines. Such machines commonly include a frame having a reference table for supporting the object and a robotics unit secured to the frame. The robotics unit is a probe which generates output signals when the probe contacts the object and the output signals are sent to a machine control unit which controls the robotics unit and calculates and displays results of inspection. The control unit is programmed to operate the coordinate measurement machine in pre-determined ways responsive to widely used syntax such as DMIS. One such coordinate measurement machine is disclosed in U.S. Pat. No. 5,198,990 issued on Mar. 30, 1993 to Farzan et al., the subject matter of which is herein incorporated by reference.

Prior art coordinate measurement machines measure an object in an x, y and z direction or cartesian motion (three perpendicular axes). Such prior art devices are illustrated in FIGS. 1A through 1J wherein FIG. 1A is a fixed table cantilever coordinate measurement machine. FIG. 1B is a moving bridge coordinate measurement machine. FIG. 1C is a fixed bridge coordinate measurement machine. FIG. 1D is a column coordinate measurement machine. FIG. 1E is a moving ram horizontal arm coordinate measurement machine. FIG. 1F is a moving table horizontal arm coordinate measurement machine. FIG. 1G is a gantry coordinate measurement machine. FIG. 1H is an L-shaped bridge coordinate measurement machine. FIG. 1I is a fixed table horizontal arm coordinate measurement machine. FIG. 1J is a moving table cantilever arm coordinate measurement machine. As is seen in 1A through 1J these prior art coordinate measurement machines measure and/or inspect the object by linear motion in an x, y and a z-direction as indicated by arrows in FIGS. 1A through 1J.

Such prior art coordinate measurement machines are not particularly suited for the measurement and/or inspection of curved or non-prismatic workpieces. Direct measurement of non-prismatic work pieces often requires multi-probe arrangement and rotary table configurations on a typical coordinate measurement machine.

Rotational mechanisms have been used extensively for transmitting rotational motion, however typically these types of mechanisms, such as a rotary table, were utilized as auxiliary devices and provide indexing or orienting motion of a workpiece. In certain measuring applications with coordinate measurement machines the work piece is mounted on top of the rotary table that provides precise indexing or orientation of the part relative to the machine. Therefore the combined system comprised four decoupled motion axes. Thus the probing of radial components could only be done by changing probing orientation.

The present invention makes up for the deficiencies of a typical prior art coordinate measurement machine. The present invention achieves direct measurement of prismatic or non-prismatic workpieces utilizing three coupled motion axis, without changing probing orientation. Thus the present invention combines the utilization of rotary motion and axial motion to achieve coordinated motion in the cartesian or polar coordinate system.

BRIEF SUMMARY OF THE INVENTION

The present invention is a motion device with two degrees of freedom translational motion and one degree of freedom rotational motion and provides means for inspecting an object in three dimension while maintaining a fixed orientation toward a centerline. A stationary round base table provides the guideways for a rotating bridge composed of two orthogonal slides. The control system provides means of coordinating the motion of axes to introduce arbitrary path motion in three dimensions. The unique concept of this system provides an optimum solution for precise positioning in polar coordinates. A typical application of such system is in measurement of curved parts. Use of the present invention allows the orientation of the measuring probe to rotate relative to the part thereby making it possible to measure curved parts without the need for re-orientation.

The present invention comprises a round granite base table and a rotating bridge. The rotation of the bridge around the base table provides a first axis of motion, the C-axis. The bridge provides linear guideways for utilization of a linear drive system or saddle which produces the second axis of motion, the x-axis. The saddle houses another linear drive system (RAM) thereby providing the third axis of motion, the z-axis. A probing system can be mounted at the bottom of the (RAM). The system is preferably housed in a cylindrical enclosure which provides for curved and sliding doors that provide flexible access to the machine.

The present invention offers exceptional features and properties that are virtually nonexistent in any other coordinate measurement machine or inspection device. The present invention operates or achieves the same purpose of prior art coordinate measurement machines but with many added advantages for inspection of round parts or parts with radial components and still fully capable of inspecting any other prismatic parts. The probing of radial components can be achieved without changing probing orientation. The present invention maintains the workpiece being measured in one orientation and eliminates the need of having a rotary table.

Accordingly, it is the principle object of the present invention to provide a coordinate measurement machine.

It is a further object of the present invention to provide a coordinate measurement machine which couples rotational and translational motion.

It is also an object of the invention to provide a coordinate measurement machine that can measure non-prismatic or radial components without changing probing orientation.

It is an additional object of the present invention to teach a mechanism for transmitting movement in three degrees of freedom where two degrees of freedom are achieved in translational motion and the third degree of freedom is achieved by rotational motion.

Numerous other advantages and features of the invention will become readily apparent from the detailed description of the preferred embodiment of the invention from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

3

Figure 1C:
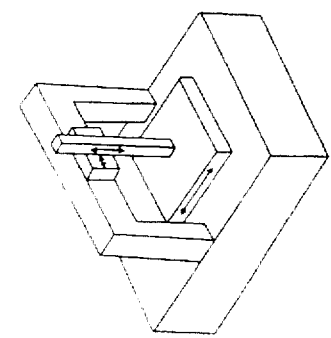
Figure 1E:
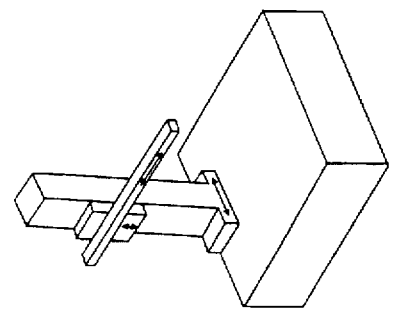
Figure 1B:
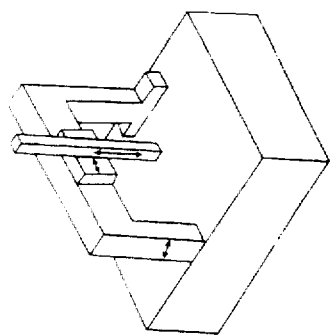
Figure 1D:
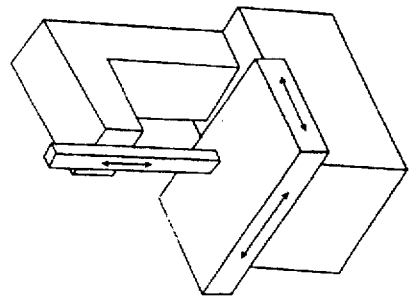
Figure 1A:
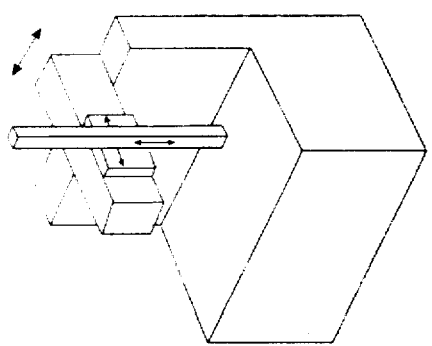
Figure 1H:
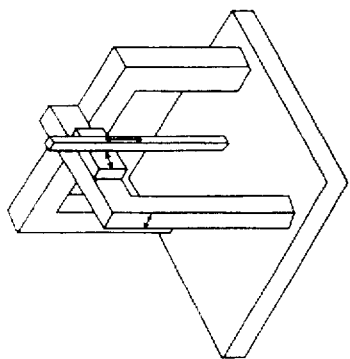
Figure 1G:
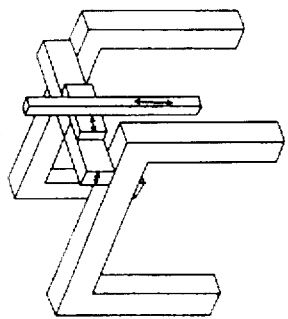
Figure 1J:
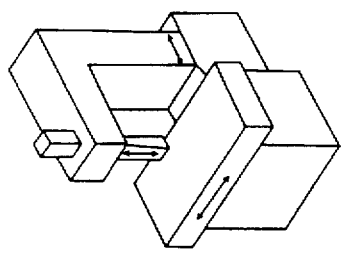
Figure 1F:
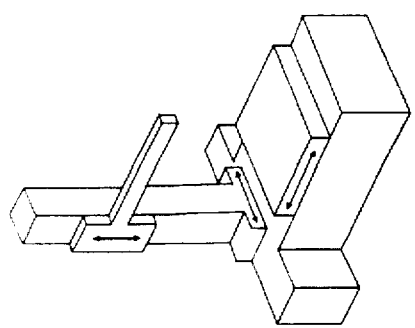
Figure 1I:
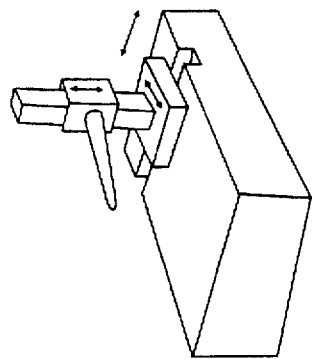
Figure 2:
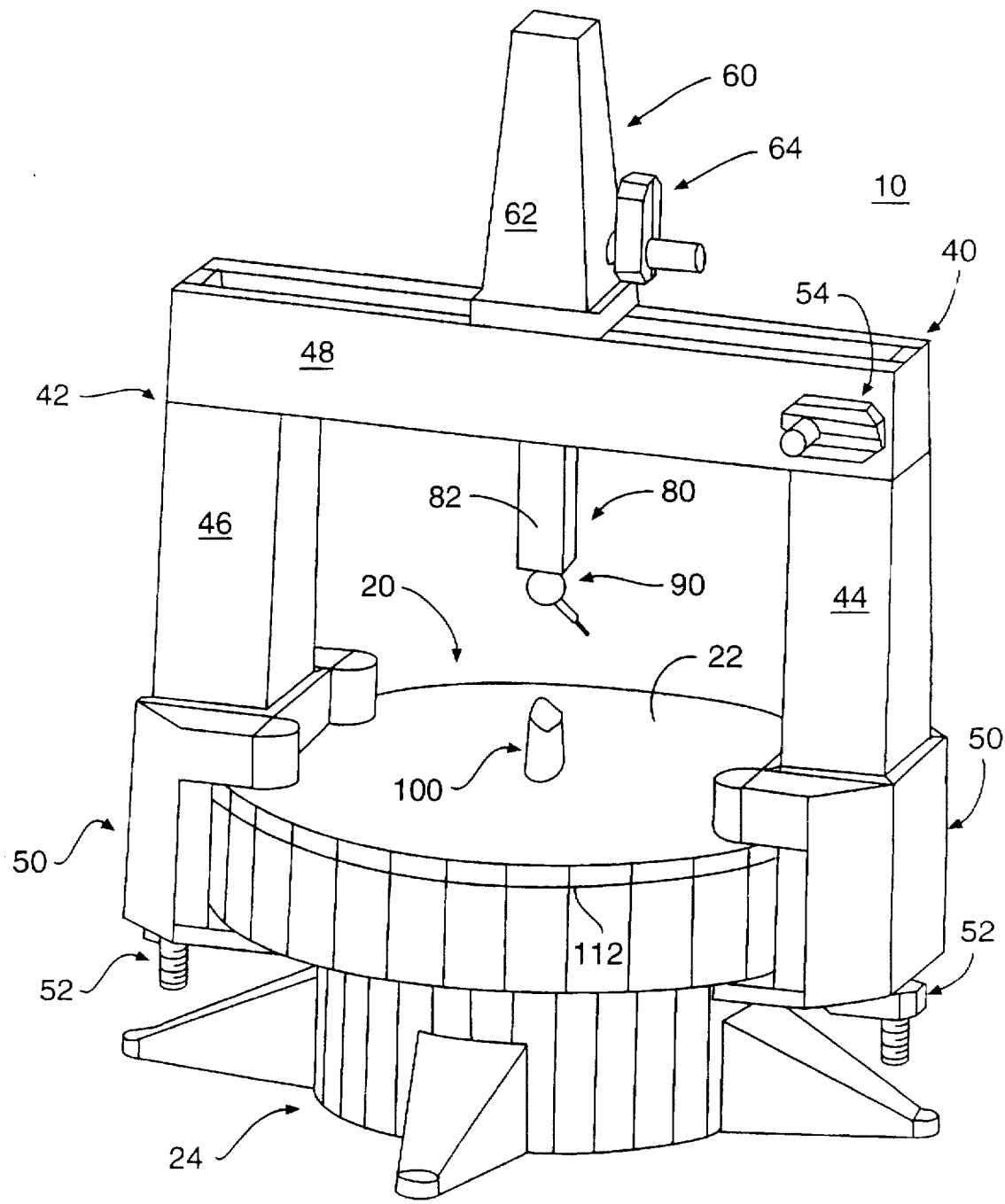
Figure 3:
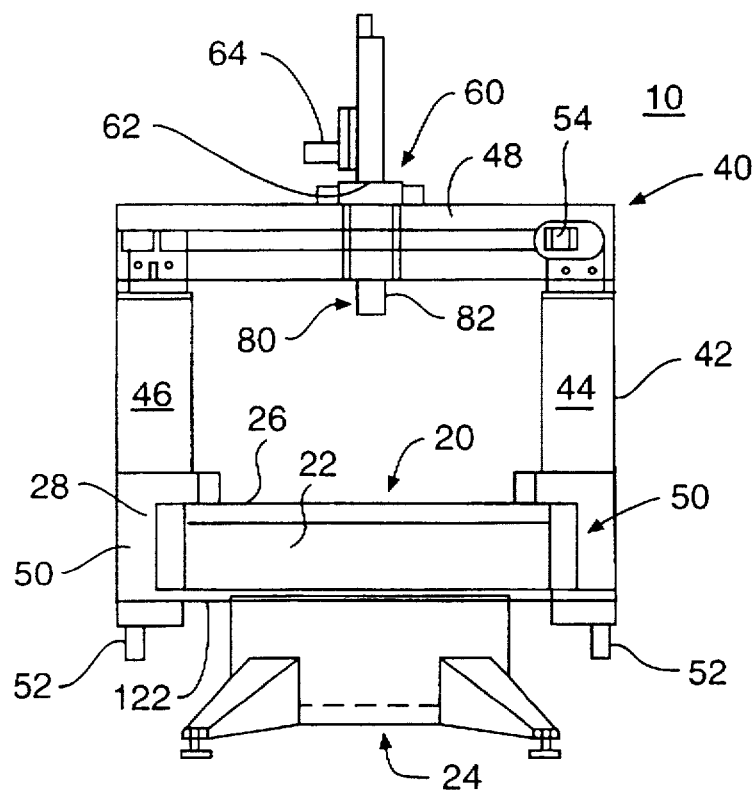
Figure 4:
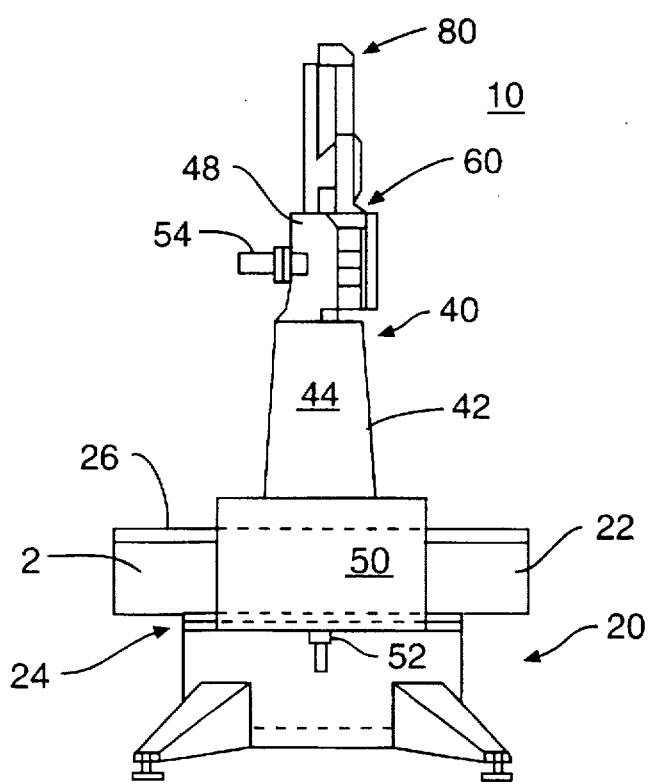
Figure 5:
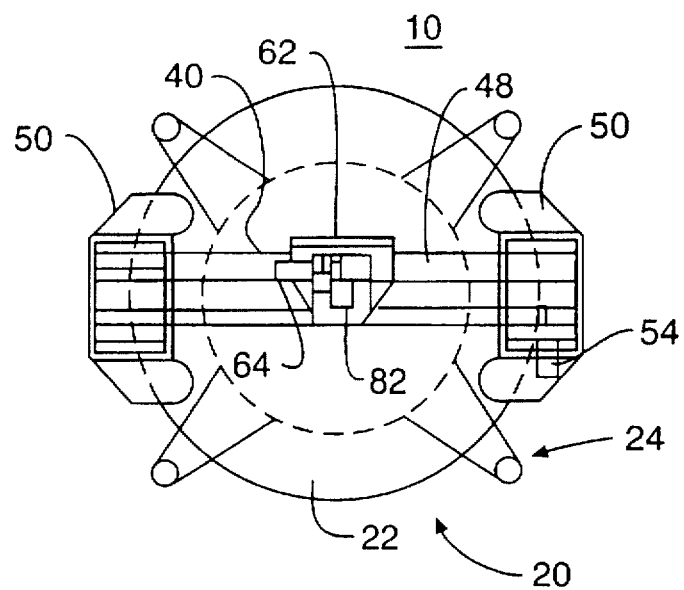
Figure 6:
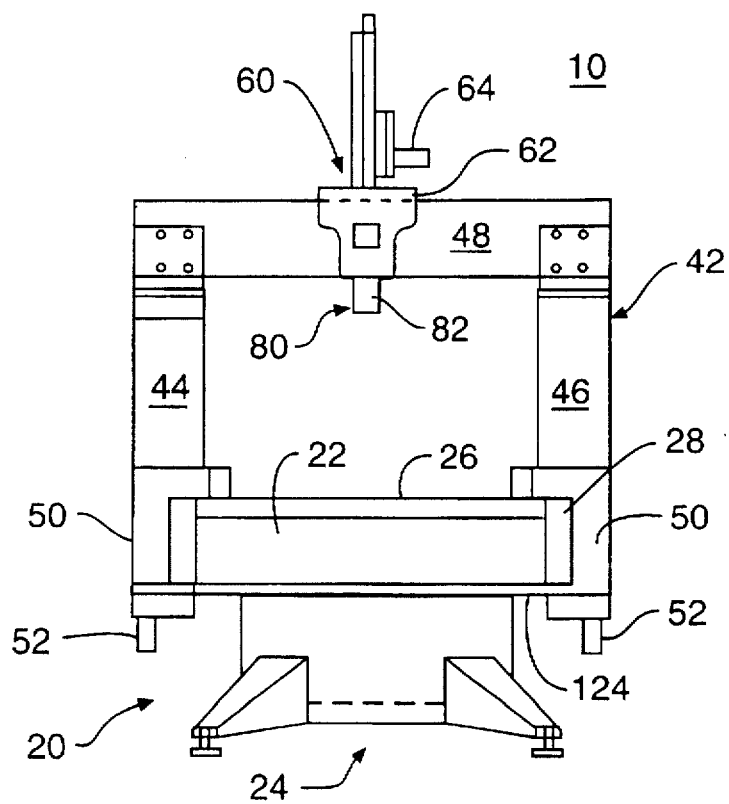
Figure 7:
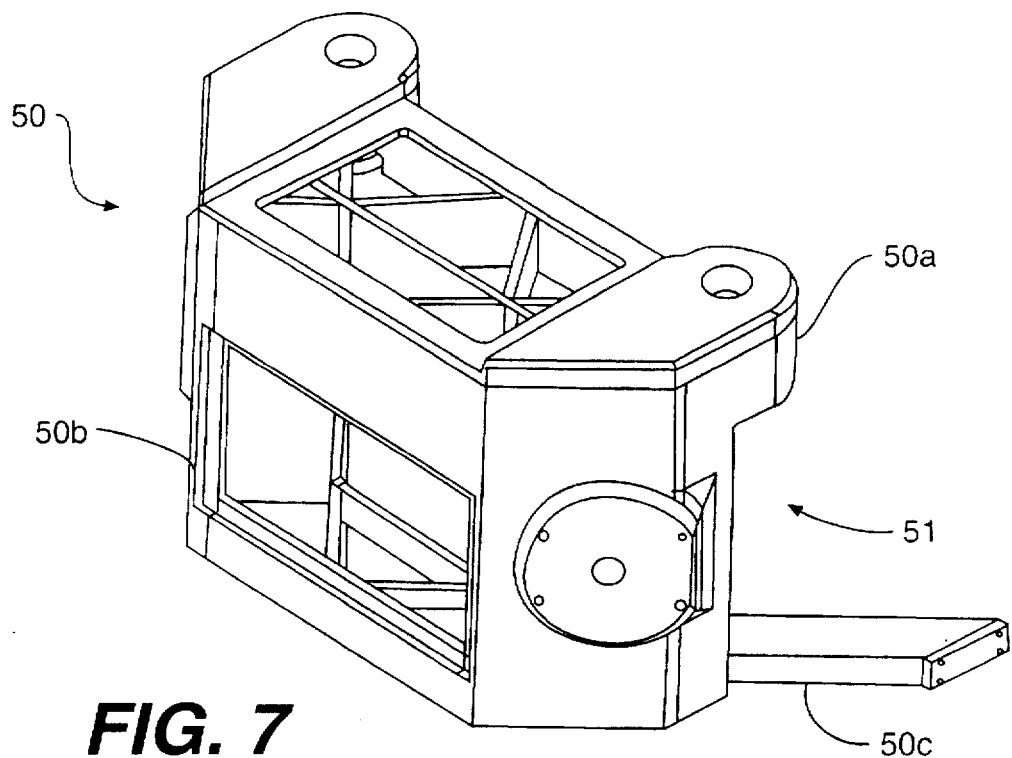
Figure 8:
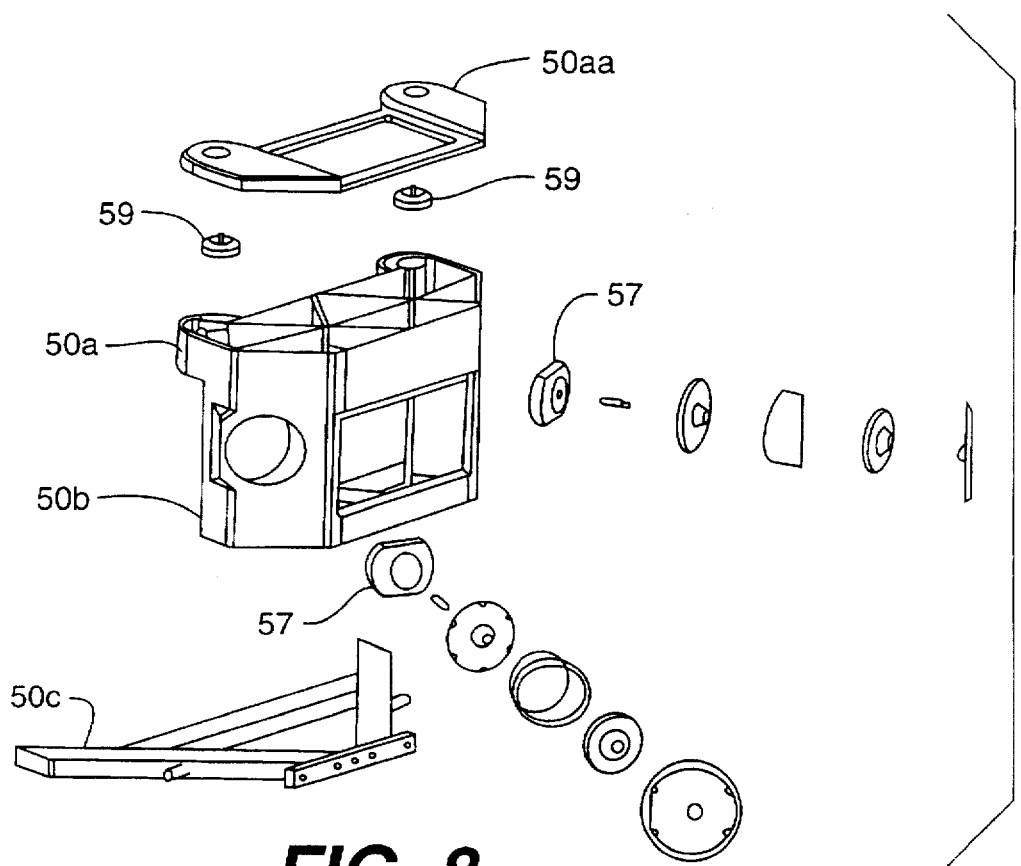
Figure 12:
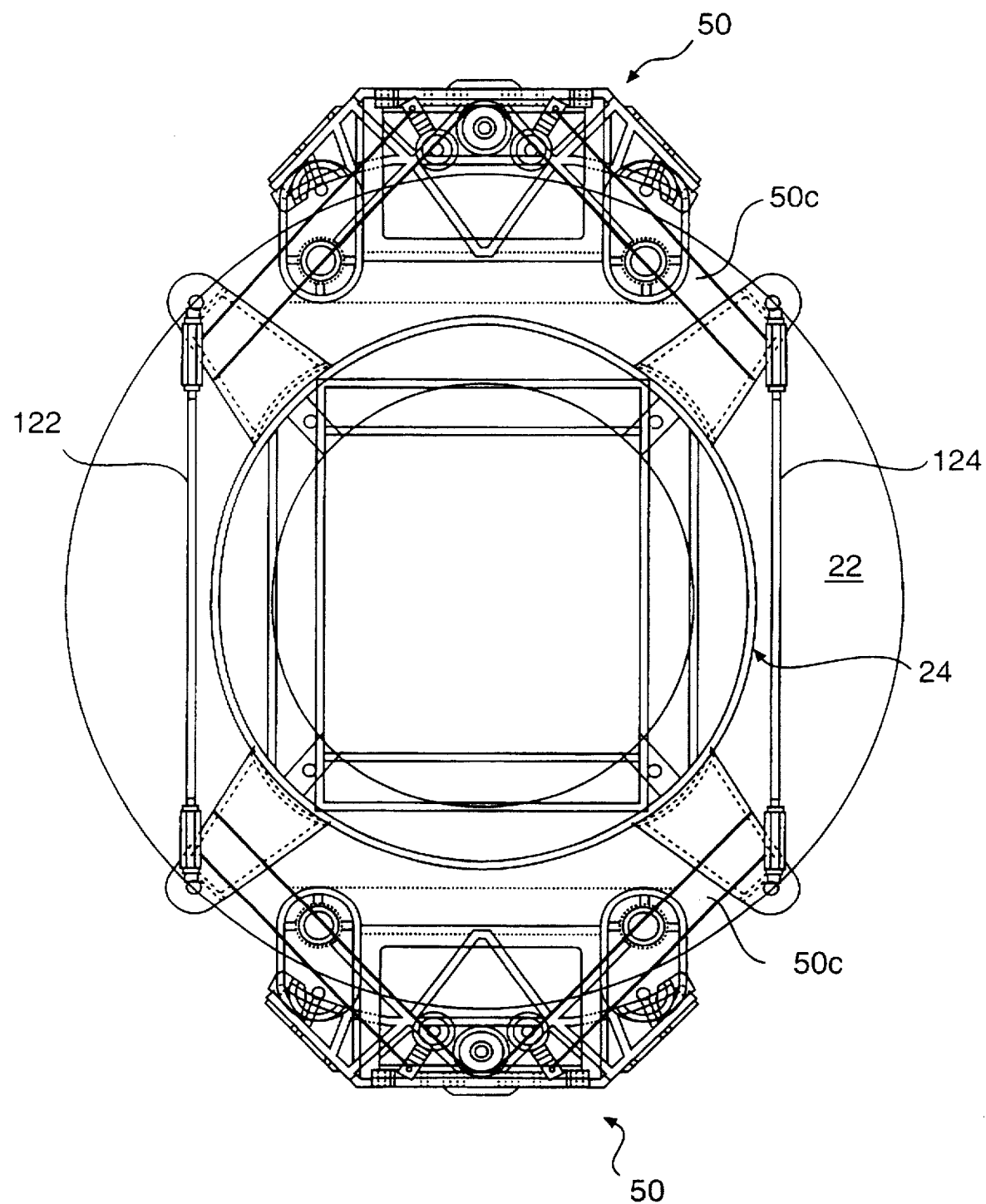
Figure 13:
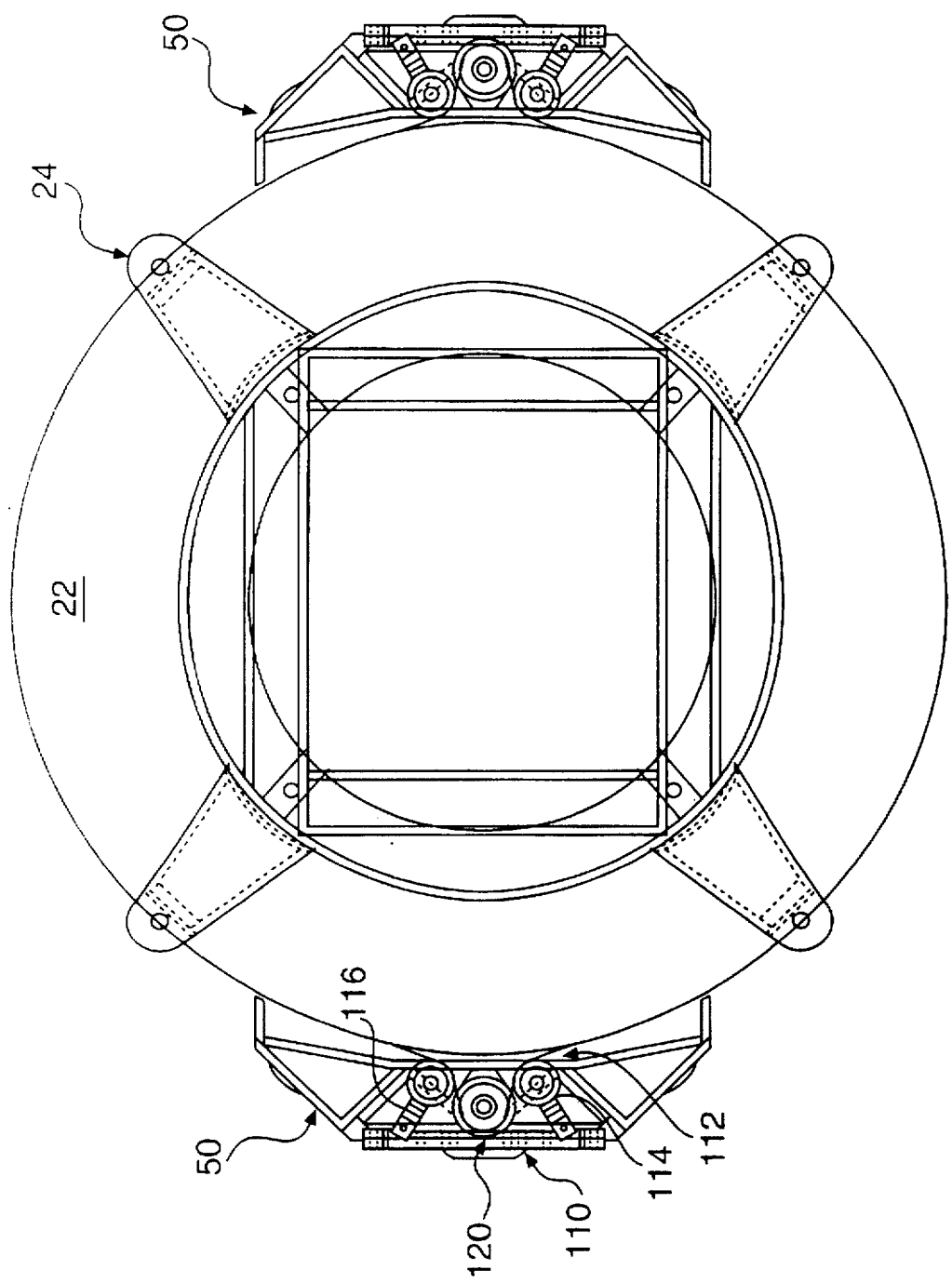
Figure 14:
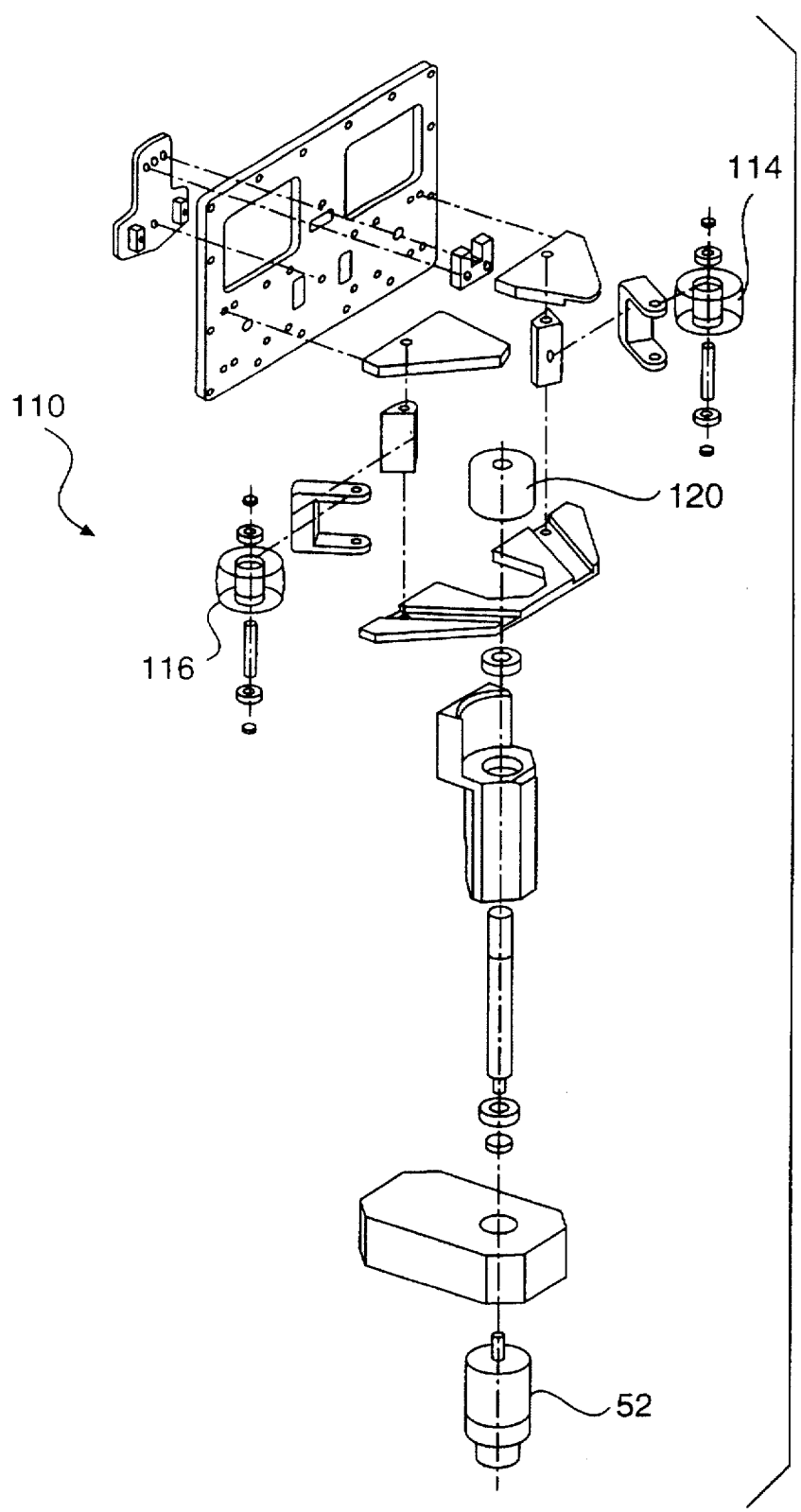
Figure 15:
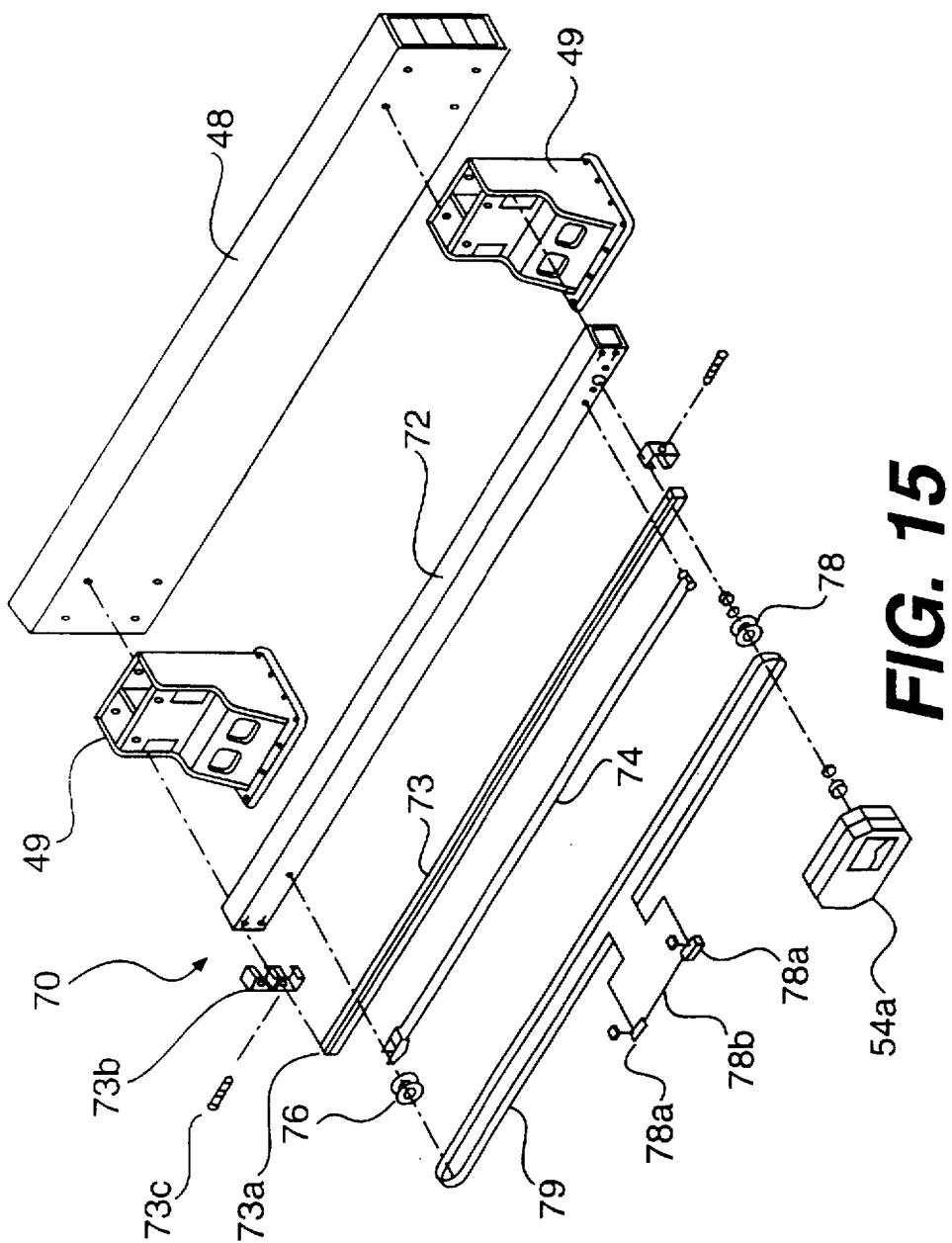
Figure 16:
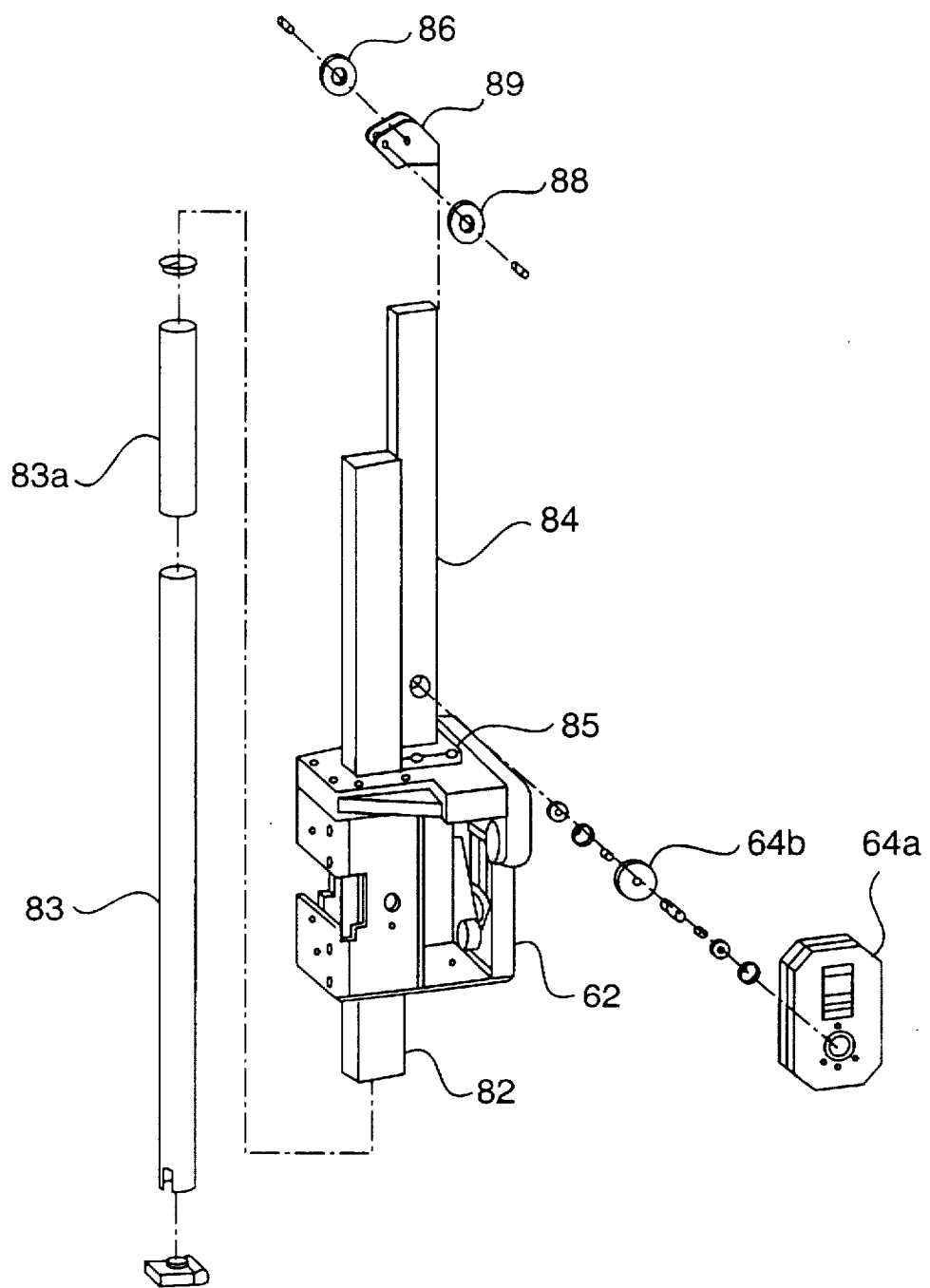
Figure 16A:
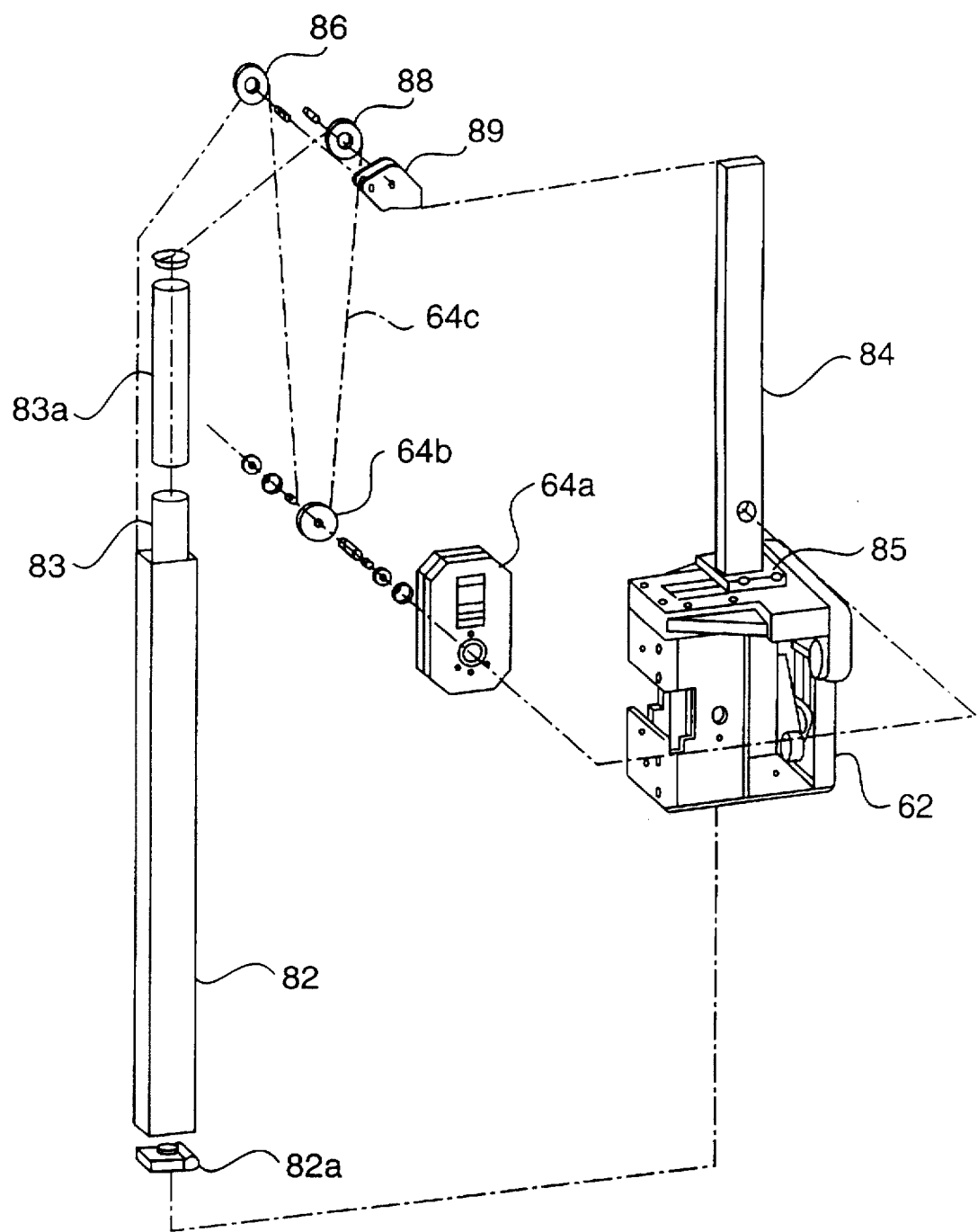
Figure 18:
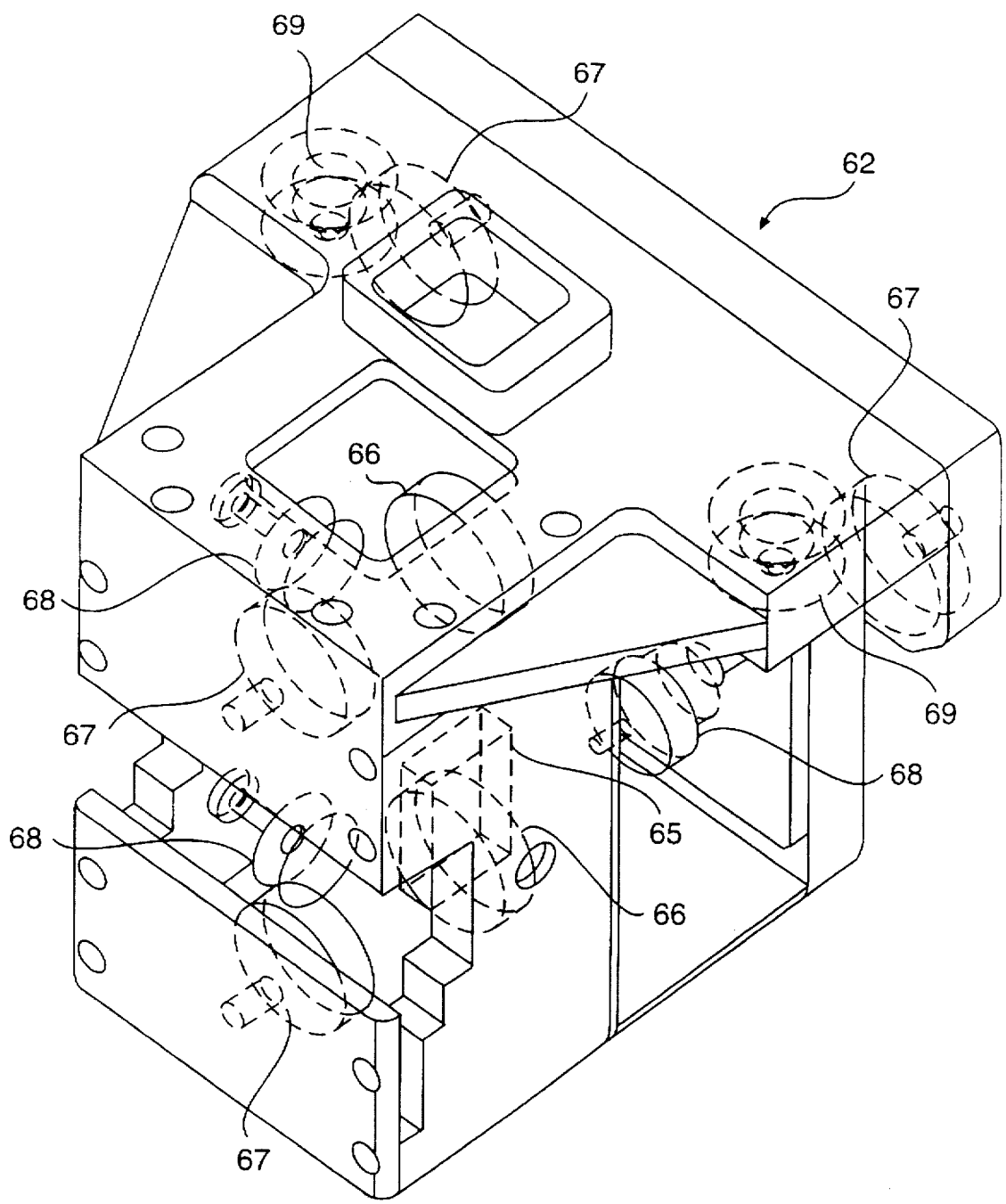
Figure 19:
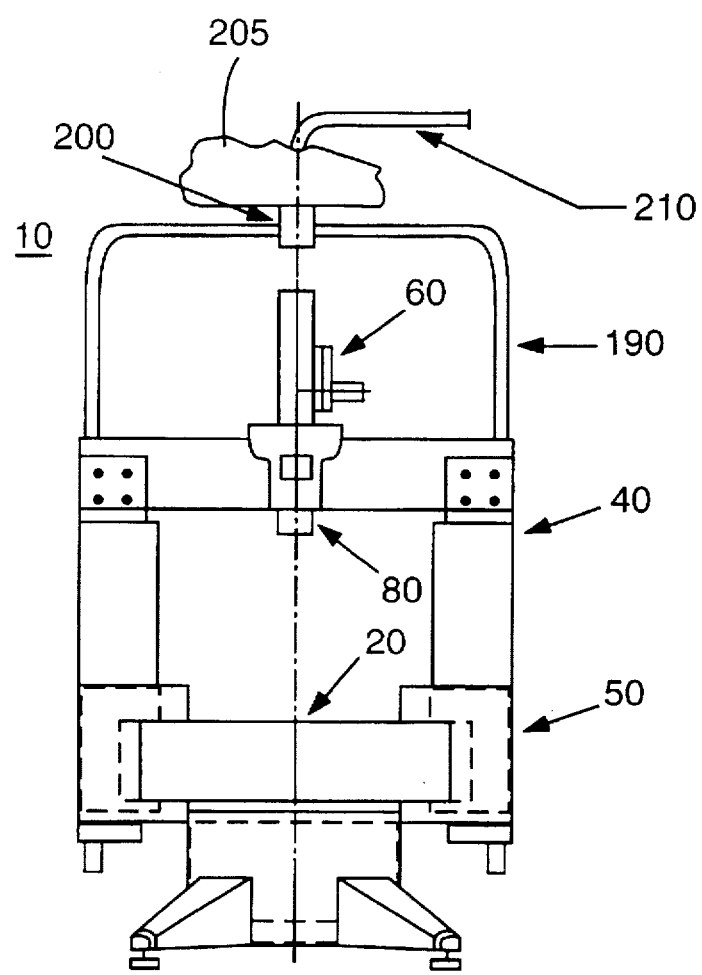

FIGS. 1A through 1J are perspective views of prior art coordinate measurement machines;

FIG. 2 is a perspective view of the present invention;

FIG. 3 is a front view of the present invention;

FIG. 4 is a side view of the present invention;

FIG. 5 is a top view of the present invention;

FIG. 6 is a back view of the present invention;

FIG. 7 is a perspective view of the carriage of the present invention;

FIG. 8 is an exploded perspective view of the carriage;

FIG. 9 is a front view of the carriage;

FIG. 10 is a side view of the carriage;

FIG. 11 is a top view of the carriage;

FIG. 12 is a top schematic view of the present invention illustrating the carriage links;

FIG. 13 is a top cross-sectional view of the drive mechanism of the present invention;

FIG. 14 is an exploded view of the drive mechanism of the present invention;

FIG. 15 is an exploded view of the x-beam of the present invention;

FIG. 16 is an exploded view of the saddle and z-axis of the present invention;

FIG. 16A is a partial exploded view of the saddle and z-axis drive cable of present invention;

FIG. 17A is a front view of the air bearings on the x-beam and the z-beam of the present invention;

FIG. 17B is a side view of the air bearings on the x-beam and the z-beam of the present invention;

FIG. 17C is a top view of the air bearings on the x-beam and the z-beam of the present invention;

FIG. 18 is a schematic perspective view of the air bearings in the saddle of the present invention;

FIG. 19 is a front view of an alternate embodiment of the invention; and

FIGS. 20A-20H are alternate embodiments of the present invention illustrating various configurations the present invention could take.

DETAILED DESCRIPTION OF THE PREFERRED EMBODIMENT OF THE PRESENT INVENTION

While the invention is suspectable of embodiment in many different forms, there is shown in the drawings and will be described herein in detail a preferred embodiment of the invention. It should be understood however that the present disclosure is to be considered an exemplification of the principles of the invention and is not intended to limit the scope of the invention and/or claims of the embodiment illustrated.

FIG. 2 shows a perspective view of the present invention 10 comprised of a base 20, a bridge 40, a saddle 60 and a z-ram 80 having a probe 90 for inspecting a workpiece 100. Base 20 includes a base plate 22 supported by a support 24. Bridge 40 comprises a bridge assembly 42 having pillars 44 and 46 and an x-beam 48. Bridge assembly 42 is supported by two carriages 50 which suitably rotate about base plate 22 via c-axis motors 52 as will be described in more detail below. Mounted on x-beam 48 and movable there along in an x-direction via x-axis motor 54 is saddle 60 comprising saddle assembly 62. Saddle assembly 62 supports z-ram 80 which comprises a z-axis beam 82 movable therein in a z-direction via z-axis motor 64. Z-axis beam 82 mounts probe 90 at its end for inspecting workpiece 100 which is placed on base plate 22.

The probe 90 is mounted to the z-axis beam 82 which slides via the z-axis motor 64 and x-axis motor 54 in two orthogonal directions x and z. The x-direction is parallel to the base plate 22 and the z-direction is perpendicular to the base plate 22.

Each carriage 50 is guided precisely around the base table 20 by means of a set of floatation bearings. One set of air floatation bearings are cylindrically constructed and surround the base table 20, while are joined to the body of carriage 50. The other set of air floatation bearings are flat and planar and support the weight of the carriages 50 and the entire upper structure bridge assembly 42 including pillars 44 and 46 and x-beam 48, saddle 60 with z-axis beam 82 and probe 90.

C-axis scale 26 is mounted and wrapped around base table 20. Reader heads 28 are mounted to carriages 50 and face the c-axis scale 26 (See FIGS. 3 and 6). The reader head detects movement of the carriage around the base table 20 and electronically reports to the control system responsible for positioning the drive system of FIG. 13.

The drive system is composed of belt 112 wrapped around base plate 22. Belt 112 also wraps around the pair of pulleys 114 and 116 enclosed in each carriage 50 (See FIGS. 13 and 14). The pinion 120 attached to drive motor 52 as shown in FIG. 13 also wraps around the belt 112. The friction between the belt and the pulleys is established by pre-loading of the pulleys. The carriages 50 are thereby joined via the belt 112 to the base plate 22. In addition to the pre-loading of the pulleys, a pair of solid links 122 and 124 also joins each carriage 50 together (See FIGS. 3, 6 and 12). Links 122 and 124 are positioned around base support 24 under base plate 22 in such a manner that the rotary motion of the carriages 50 about the base plate 22 does not interfere with the base support 24.

FIG. 3 shows a front view of the present invention 10 comprising base 20 including base plate 22 having c-axis scale 26 mounted thereon. Scale 26 is read by a reader head 28 mounted in each carriage 50. Bridge 40 can be seen including bridge assembly 42, pillars 44 and 46, and x-beam 48. Bridge 40 is supported by carriages 50 which each include a c-axis motor 52. Mounted at one side of the x-beam 48 is the x-axis motor and encoder 54 which provides movement of saddle 60 along x-beam 48. Saddle 60 includes saddle assembly 62 and z-axis motor 64 mounted thereto. Saddle assembly 62 supports z-ram 80 which includes z-axis beam 82, selectively moveable by z-axis motor 64. Solid link 122 connects each carriage 50 in such a manner so as not to interfere with rotation of the carriages 50 around base plate 22.

FIG. 4 illustrates a side view of the present invention comprising base 20 including base plate 22 and support 24. Bridge 40 including bridge assembly 42 and pillar 44 can be seen supported by carriage 50. Mounted to x-beam 48 is the x-axis motor 54 and saddle 60 which supports z-ram 80.

FIG. 5 illustrates a top view of the present invention wherein base 20 comprising base plate 22 is seen supported on top of support 24. Carriages 50 are shown positioned around base plate 22 and supporting bridge 40. X-beam 48 of bridge 40 can be seen having x-axis motor 54 mounted thereto as well as saddle assembly 62. Z-axis motor 64 is mounted to saddle assembly 62 which supports z-axis beam 82. As can be seen in FIG. 5 the x-beam 48 is off center with respect to base plate 22. This allows the z-axis beam 82 to pass through the center line of base plate 22.

FIG. 6 illustrates a back view of the present invention 10 wherein base 20 comprises base plate 22 supported by support 24. Base plate 22 includes the c-axis scale 26 which is read by reader head 28 mounted in carriages 50. Bridge assembly 42 can be seen including pillars 44 and 46 and x-beam 48. Bridge assembly 42 is supported by carriages 50 having c-axis motors 52 mounted thereto for rotation of the bridge assembly and carriages around base table 22 as will be described in more detail below. As can be seen solid link 124 connects the two carriages of the present invention underneath base plate 22 in such a manner so as not to interfere with rotation of carriages 50 and bridge assembly 42 around base plate 22. Mounted to x-beam 48 is saddle 60 including saddle assembly 62 with z-axis motor 64 attached thereto. Saddle assembly 62 supports z-ram 80 including z-axis beam 82.

FIG. 7 illustrates a perspective view of carriage 50. While it should be understood that carriage 50 could be any suitable shape to allow it to rotate around base plate 22, carriage 50 is preferably generally C-shaped (see FIG. 10) and having a top portion 50A, a side portion 50B, and a bottom portion 50C, wherein the top, side and bottom portions 50A, 50B and 50C respectively define an opening 51 for partially receiving the outer edges of base plate 22 (as can be seen in FIGS. 3 and 6).

FIG. 8 is an exploded perspective view of carriage 50 illustrating top portion 50A, side portion 50B, and bottom portion 50C. Top portion 50A includes a cover panel 50AA. Top, side and bottom portions 50A, 50B and 50C are connected by any suitable means such as fasteners or welds. As can be seen, carriage 50 includes four air bearings, two round/radial carriage bearings 57 and two flat carriage bearings 59. Bearings 57 are used to guide the carriage around the base table. Bearings 59 are used to support the carriage on the base table.

FIGS. 9–11 illustrate carriage 50. FIG. 9 is a front view showing cover panel 50aa, side portion 50b and bottom portion 50c. FIG. 10 is a side view showing cover 50aa, top portion 50a, side portion 50b, and bottom portion 50c. As can be seen, carriage 50 is preferably generally c-shaped. As further can be seen, side portion 50b is sufficiently wide enough to house drive system 110 therein. FIG. 11 is a top view showing cover 50aa, top portion 50a, side portion 50b and bottom portion 50c.

FIG. 12 illustrates a schematic top view of the present invention wherein base plate 22 rests atop base 24. Carriages 50 are mounted for rotation about the outer periphery of base plate 22. Coupling carriages 50 together are solid links 122 and 124. Solid links 122 and 1214 are suitably fastened to the ends of bottom portions 50c of carriages 50. Accordingly, carriages 50 are coupled for synchronized rotation about base plate 22 via solid links 122 and 124 which are sufficiently spaced from base support 24 and remain in tangential relationship thereto at all times.

FIG. 13 illustrates a cross-sectional view of the drive system 110 of the present invention. As can be seen, base plate 22 includes diametrically opposed carriages 50 containing a drive system 110. Drive system 110 includes a belt 112 and pulleys 114 and 116. A drive pinion 120 is mounted to the drive shaft of the c-axis motor 52. Belt 112 is positioned around pinion 120 of each carriage 50 and along the inside of pulleys 114 and 116 of each carriage 50 and around base plate 22. Rotation of the pinions 120 in carriages 50 by c-axis motors 52 imparts rotation to carriage 50 in a desired direction, via frictional forces created in belt 112 against base plate 22 thereby causing pinions 120 to roll along belt 112, thus propelling carriages 50 and bridge 40 around base plate 22.

FIG. 14 is an exploded view of drive system 110 illustrating idler pulleys 114 and 116 and drive pinion 120 and their associated mounting hardware. Drive motor 52 operates to rotate pinion 120 to impart rotation to the carriages as described above. In its assembled position, pulley 114 and 116 and pinion 120 are housed inside of carriage 50 while motor 52 is mounted under carriage 50. It should be understood that any suitable drive means may be used to effect rotational movement of the carriages 50 about base plate 22. Further, any suitable arrangement of pulleys and/or gears and motors may be utilized without departing from the teachings herein.

FIG. 15 illustrates an exploded view of the x-beam assembly of the present invention comprising x-beam 48 which is mounted to pillow blocks 49. A tension beam assembly 70 is mounted to the opposite side of pillow blocks 49. Tension beam assembly 70 includes a tension beam 72, a strap assembly 73 and the x-axis drive assembly. The strap assembly 73 comes under tension via a bolt 73c that goes through an end block 73b and screws to the end 73a of the strap assembly 73. The x-axis drive assembly comprises a yolk assembly 74 supporting an idler pulley 76, a drive pulley 78 suitably connected to a gear box 54A of x-axis motor 54, and a drive belt 79 which runs around drive pulley 78 and idler pulley 76. The ends of belt 79 are attached to belt mounting brackets 79a, which in turn are mounted to the saddle. An adjusting screw 79b allows the belt 79 to be tensioned. In this manner x-axis motor 54 drives the saddle assembly 62 in an x-direction along the x-axis beam assembly. The tension beam assembly 70 is required to oppose the forces generated in the x-axis beam 48 by air bearings of the carriage and in conjunction with the tie rod. Strap assembly 73 provides a means for causing a pre-load in the tension beam 72. The transmission for the drive system of the x-axis mounts to the tension beam. The output shaft of the transmission drives the drive pulley which is held by pins inside the tension beam. A drive belt goes through the main drive pulley and connects or clamps to the saddle assembly. On the opposite side of the main drive pulley is the idler pulley which is held via the yoke assembly such that tension of the belt will cause the compression on the yoke assembly.

FIG. 16 illustrates an exploded view of the saddle and the z-axis of the present invention. As can be seen, the z-axis beam 82 is slidably mounted in the saddle assembly 62, which is slidably mounted on the x-axis beam assembly. Inside the z-axis beam 82 is a stationary tube 83 having a counter weight 83a which moves inside stationary tube 83. The z-beam is positional via the z-axis drive system which includes a z-axis riser tube 84 mounted on top of saddle assembly 62 via a mounting bracket at 85. Mounted atop z-axis riser tube 84 is a z-axis riser mounted bracket 89 which mounts a secondary drive pulley 86 and a counter weight cable return pulley 88. As seen in FIG. 16A, the z-axis drive system drives the z-axis cable 64c which loops around the primary pulleys 64b and 86 and connects to the z-axis end block 82a. The other end of cable 64c loops around the secondary pulley 88 and connects to the counter weight 83a. The z-axis drive cable 64c is driven via the z-axis drive pulley 64b which is suitably connected to the z-axis gear box 64a of the z-axis motor 64.

FIGS. 17A, 17B and 17C illustrate the air bearings for movement of the saddle along the x-beam and movement of the z-axis beam within the saddle. There are five different air bearings used for the x and z directional movement of the present invention. The z-axis guide bearings 65, the duplex air bearings 66, the saddle guide bearings 67 and 68 and the saddle support bearings 69. The z-axis guide bearings 65 guide the z-axis on the side to slide against the saddle. As can be seen in FIG. 17A two saddle guide bearings 68 are opposing a single square bearing 65. Saddle guide bearings 67 and 68 guide the saddle from the back and guide the z-axis from the front. As can be seen in FIG. 17C, there are three saddle guide bearings in back of the x-beam and two saddle guide bearings in front of the x-beam. Saddle support bearings 69 support the weight of the saddle on top of the x-axis as can be seen in FIGS. 17A and 17C. Duplex air bearings 66 are dual sided air bearings used to guide the z-axis over the x-axis. Two duplex air bearings 66 are used as illustrated in FIG. 17B.

Accordingly, as illustrated in FIG. 18, there are twelve total air bearings used in the saddle assembly 62 for movement of the saddle along x-beam 48 and movement of the z-axis beam 82 within the saddle assembly 62. As can be seen in FIG. 18, there is one z-axis guide. bearing 65, two duplex air bearings 66, four saddle guide bearings 67, three saddle guide bearings 68 and two saddle support bearings 69.

FIG. 19 illustrates an alternate embodiment of the present invention. It is foreseen that it may be advantageous to allow for invention 10 to be connected to a power supply (rather than containing all on-board power systems), yet at the same time remain fully and continually rotational. Accordingly, invention 10 comprising base 20, bridge 40, carriages 50, saddle 60 and z-ram 80, further includes a power supply conduit 190 suitably attached to bridge 40, for rotation therewith. Conduit 190 is connected to a slip ring 200 which is suitably mounted in a fixture 205 and connected with a second power supply conduit 210 leading to a suitable power supply. Thus, slip ring 200 allows for a 360 degree, continuous, bi-directional rotation which transfers electrical signals, power energy and compressed air from conduit 210 to conduit 190. Slip ring 200 can be any suitable slip ring as is used and known in the art, for example Model No. W30B08H04 manufactured by Electrotec in Blacksburg, Va. Further, slip ring 200 and conduit 190 can be positioned in any suitable location about invention 10 so long as they allow for 360 degree continuous, bi-directional rotation.

While the preferred embodiment is shown and described in terms of the stationary and moving components, the invention can be operated in any suitable configuration in which the stationary and moving components differ to those presented in the embodiment shown above. FIGS. 20A–20H illustrate alternate embodiments of the present invention taking various configurations, and having a first, a second, and a third means for moving a probe in a first, a second, and a third degree of freedom, as illustrated by the arrows in FIGS. 20A–20H.

Figure 20A:
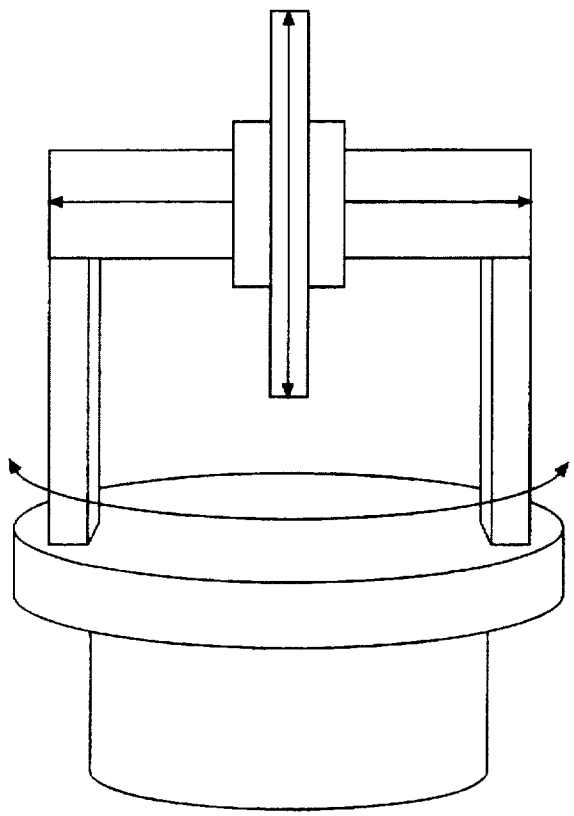

FIG. 20A shows moving bridge rotation/translation coupled positioning system (this example is described in detail above).

Figure 20B:
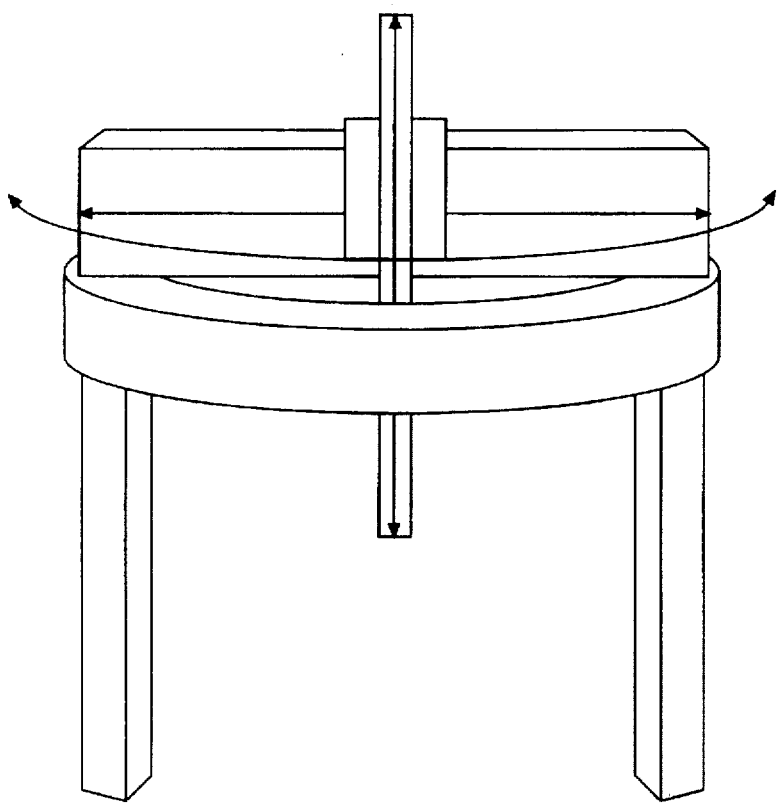

FIG. 20B shows a gantry rotation/translation coupled positioning system.

Figure 20C:
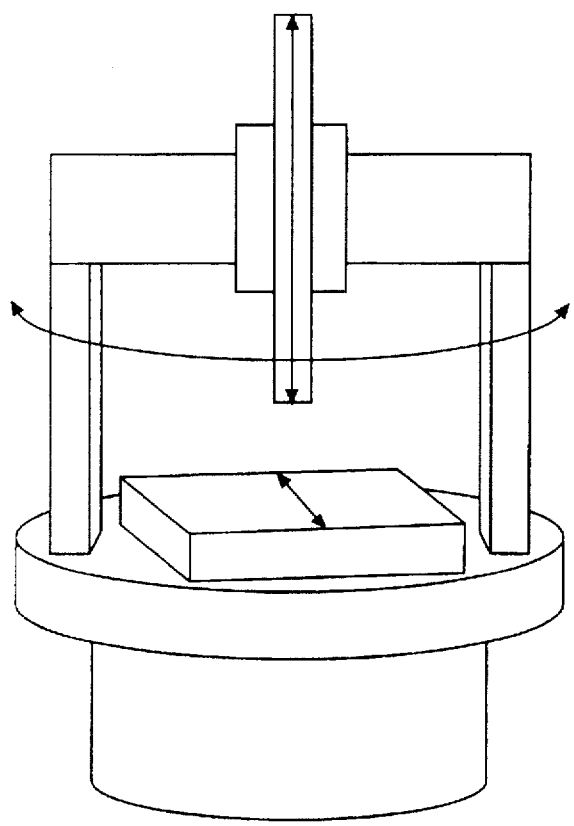

FIG. 20C shows a moving table, rotating bridge positioning system.

Figure 20D:
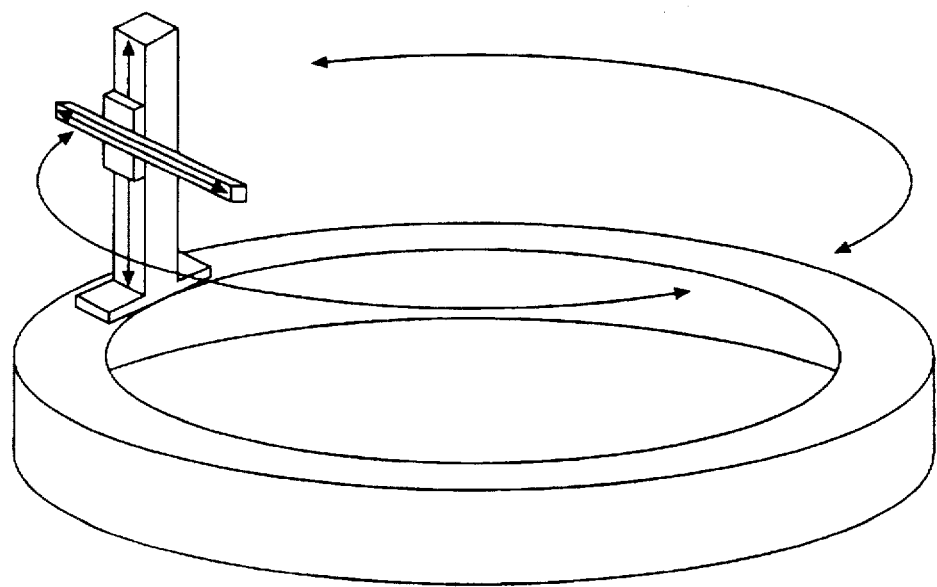

FIG. 20D shows a horizontal arm rotation/translation coupled system.

Figure 20E:
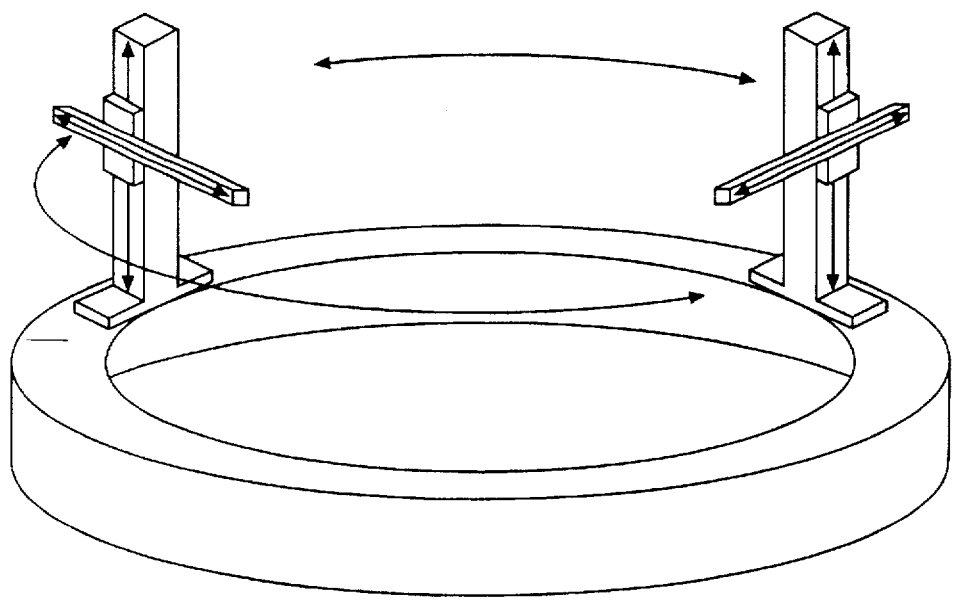

FIG. 20E shows an example of a system where two horizontal arm rotational/translation coupled systems are moving along a single rotating guideway. Such a system would allow for simultaneous positioning of two probes orientated toward the stationary workpiece.

Figure 20F:
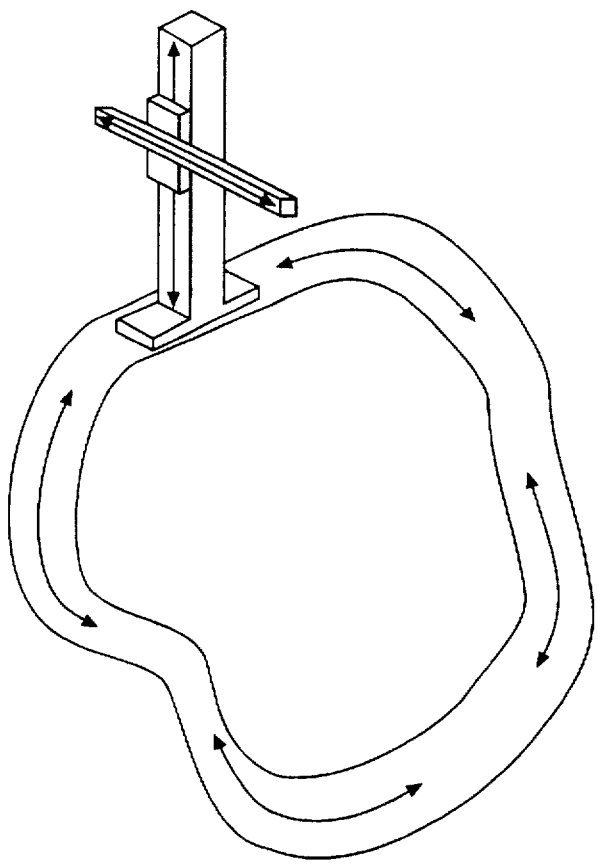

FIG. 20F shows the general concept of the present invention applied to a closed form and arbitrary path guideway.

Figure 20G:
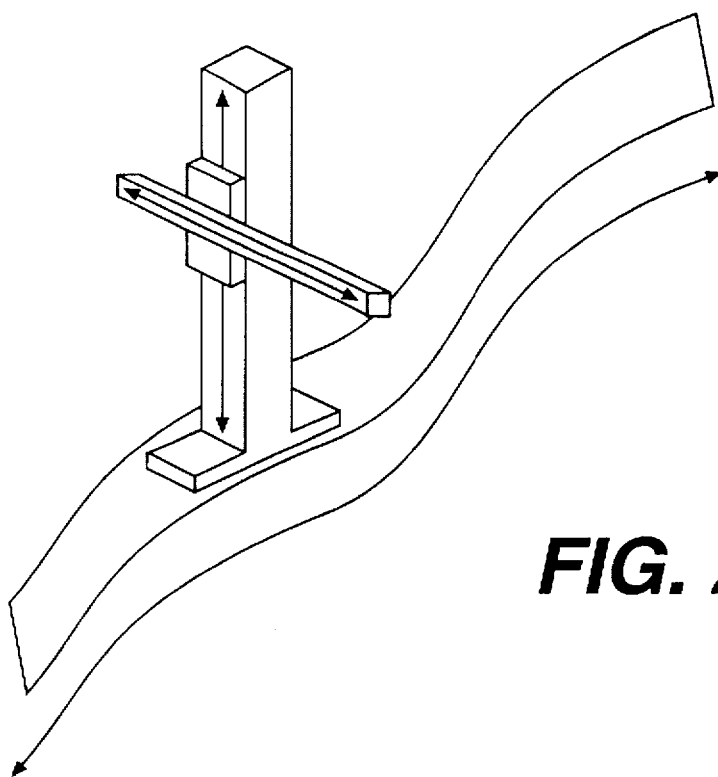

FIG. 20G shows the general concept of the present invention applied to an open form and arbitrary path guideway.

Figure 20H:
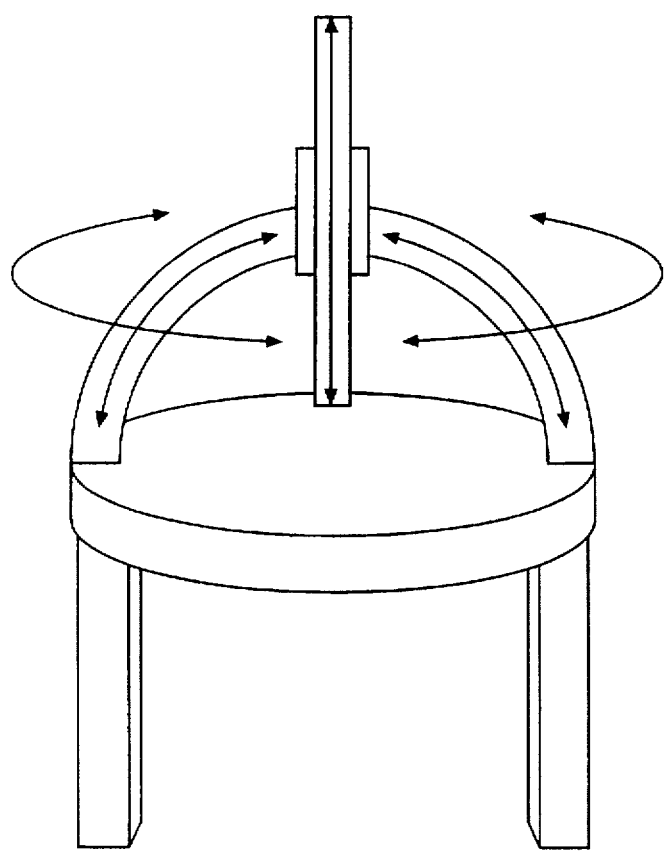

FIG. 20H shows the general concept of the present invention when applied to two rotational axes and one translational axis. Such a system would allow the advantages of the present invention while the work volume is spherical. This type of configuration provides for orientation of the probe such that at any point in the volume, the axes of the probe pass through the center of volume.

Although there are other configurations of rotational and translationally coupled systems can be described, the principal objective of the present invention is to emphasize in positioning systems where the workpiece is not rotating relative to the machine, thereby reducing the inaccuracies due to the rotating tables, and gaining the advantages of the orientation of the probe to the workpiece.

The present invention herein described is suitable for use as a polar positioning device capable of positioning an end effector or probe 90 throughout the work place. The probe could take any suitable form, for example a position sensing probe or a processing probe. Examples of position sensing probes that are typically used in a coordinate measuring machine are touch trigger probes, scanning probes (contact type), non-contact probe (laser or other), and Linear Variable Differential Transducer (LVDT) probes. Examples of processing probes are laser welding probes used in a welding application, and a laser cutting probe for use in a cutting application. It should be understood that the present invention is suitable for positioning any device in a three dimensional area. For example, the end effector could take the form of any tool such as a cutting implement, etc.

As should be understood from the above disclosure, the present invention describes an apparatus (or series of apparatus in general) which provide means of positioning an object (probe) in relation to a workpiece. According to the principles of the present invention, an object can be positioned in relation to a workpiece in 6 degrees of freedom (three translational and three rotational degrees of freedom). To achieve this objective, certain apparatus can provide means of positioning the probe in all six degrees of freedom, while others provide a number of degrees of freedom for positioning the probe in combination with other degrees of freedom for positioning the workpiece via worktable. The preferred embodiment of the invention however describes a positioning system where the workpiece does not move thereby reducing the possibilities of dynamic errors associated with variations of workpiece loads on the worktable.

It is to be understood that the embodiments herein described are merely illustrative of the principles of the present invention. Various modifications may be made by those skilled in the art without departing from the spirit or the scope of claims which follow.

What is claimed is:

1. An apparatus for transmitting movement in three degrees of freedom comprising:

means for achieving translational motion in two degrees of freedom; and means for achieving rotational motion in a third degree of freedom, said means for achieving rotational motion being coupled to said means for achieving translational motion;

said means for achieving rotational motion including at least one carriage movable about a c-axis, said at least one carriage being slidably mounted around an outer peripheral edge of a base plate, said at least one carriage selectively positionable around said base plate by a means for driving.

2. The apparatus of claim 1, wherein said means for achieving translational motion includes an arm movable along a z-axis, said arm being mounted in a saddle movable along an x-axis.

3. The apparatus of claim 2, wherein said saddle and said arm are coupled to said at least one carriage through a means for coupling.

4. The apparatus of claim 3, wherein said means for coupling is a bridge assembly.

5. The apparatus of claim 1, wherein said means for driving includes a drive motor, a drive pinion, at least one tensioning pulley and a drive belt, said drive belt surrounding said base plate and said drive pinion and being tensioned by said at least one pulley.

6. The apparatus of claim 1, wherein said apparatus further includes a means for controlling the positioning of said carriage about said base plate.

7. The apparatus of claim 6, wherein said means for controlling includes a readable scale about the periphery of said base plate and a reader head in said at least one carriage for reading said scale.

8. The apparatus of claim 1, wherein said at least one carriage numbers two.

9. An apparatus for positioning a device in a three-dimensional area comprising:
    first means for positioning said device in a z-direction;
    second means for positioning said device in an x-direction, said second means cooperatively associated with said first means; and
    third means for positioning said device about a c-axis, said third means for positioning coupled to said first and second means for positioning;
    said third means for positioning includes at least one carriage movably positionable about a base table having a top surface, a bottom surface and a peripheral edge;
    said at least one carriage being generally c-shaped in cross-section and includes a top support portion, a side portion, and a bottom portion defining an open area.

10. The apparatus of claim 9, wherein said top support portion and said bottom support portion each include a bearing assembly, said bearing assembly of said top support portion being cooperatively associated with said top surface of said base table and said bearing assembly of said bottom support portion being cooperatively associated with said bottom surface of said base table.

11. The apparatus of claim 10, wherein said peripheral edge of said base table extends partially into said open area of said at least one carriage.

12. The apparatus of claim 9, wherein said device is one of a measurement device or a tool.

13. An apparatus for positioning a device in a three-dimensional area comprising:
    first means for positioning said device in a z-direction;
    second means for positioning said device in an x-direction, said second means cooperatively associated with said first means; and
    third means for Dositioning said device about a c-axis, said third means for positioning coupled to said first and second means for positioning;
    said third means for positioning includes at least one carriage movably positionable about a base table having a top surface, a bottom surface and a peripheral edge;
    said at least one carriage includes a means for driving said at least one carriage around said peripheral edge of said base table;
    said means for driving includes a drive motor and a drive pinion in said at least one carriage, and a belt surrounding said base table and said drive pinion.

14. The apparatus of claim 13, wherein said apparatus further comprises a means for determining the exact position of said at least one carriage around said base table, said means for determining including a readable scale on the peripheral edge of said base table and a reader head in said at least one carriage.

15. A coordinate measurement and inspection apparatus for positioning a probe in a workspace about a workpiece located on a base plate, said apparatus comprising:
    a first means for positioning said probe in a direction parallel to said base plate;
    a second means for positioning said probe in a direction perpendicular to said base plate, said second means cooperatively associated with said first means;
    a third means for positioning said probe about a central axis of said base plate, said third means being coupled to said first and second means;
    said third means comprises at least one carriage selectively rotationally mounted on a periphery of said base plate; and
    a means for driving said at least one carriage around said base plate.

16. The apparatus of claim 15, wherein said first and second means are mounted on a bridge assembly, said at least one carriage supporting said bridge assembly.

17. The apparatus of claim 15, wherein said means for driving comprises a drive motor, drive pinion, and a belt.

18. The apparatus of claim 15 wherein said at least one carriage includes two carriages.

19. The apparatus of claim 18 wherein said two carriages are coupled via solid links.

20. The apparatus of claim 15, further comprising means for determining the position of said carriage about said base plate.

21. An improved coordinate measurement machine having means for positioning a probe in an x-direction and a z-direction for inspecting a workpiece on a base plate, said improvement comprising:
    a means for positioning said probe around a central axis of said base plate, said means for positioning around a central axis being coupled to said means for positioning in an x-direction and a z-direction;
    said means for positioning around a central axis includes at least one carriage slidably mounted on a peripheral edge of said base plate.

22. The improvement of claim 21, wherein said means for positioning further includes a means for driving said at least one carriage about said peripheral edge of said base plate.

23. A method for positioning a device in a three-dimensional area above a support structure, said method comprising the steps of:
    mounting said device on a means for positioning in a first direction;
    mounting said means for positioning in a first direction to a means for positioning in a second direction, said second direction being perpendicular to said first direction, and
    mounting one of said means for positioning in a first direction and said means for positioning a second direction to a means for rotation;

mounting said means for rotation on a peripheral edge of said support structure for movement thereabout; and positioning said device via selected actuation of said means for positioning in a first direction, said means for positioning in a second direction, and said means for rotation.

24. An apparatus for positioning a device in a three-dimensional space, comprising:

a first means for translational movement of said device in at least two of a first degree of freedom, a second degree of freedom, and a third degree of freedom; and a second means for moving said device in at least one rotational degree of freedom;

said first means being coupled to said second means;

said second means being selectively positionable about a periphery of said three-dimensional space.

25. An improved coordinate measurement device having a means for positioning a tool in at least two degrees of translational movement for taking measurements of an object on a base plate, said improvement comprising:

at least one carriage mounted on a peripheral edge of said base plate, said peripheral edge of said base plate being curvilinear, said carriage supporting said means for positioning, and being selectively positionable along said curvilinear peripheral edge to achieve at least one degree of rotational movement.

* * * * *